United States Patent [19]

Cambria

[11] Patent Number: 4,485,689
[45] Date of Patent: Dec. 4, 1984

[54] SHIFT CONTROL ASSEMBLY

[75] Inventor: Emanuel F. Cambria, Tannersville, Pa.

[73] Assignee: Hurst Performance, Inc., Warminster, Pa.

[21] Appl. No.: 456,798

[22] Filed: Jan. 10, 1983

[51] Int. Cl.³ ............... B60K 20/00; F16H 57/06; G05G 5/10; G05G 11/00
[52] U.S. Cl. ............................ 74/477; 74/475; 74/476; 74/473 R; 74/479; 74/538; 74/97
[58] Field of Search .............. 74/473 R, 475, 476, 74/477, 483 PB, 479, 538, 97, 364

[56] References Cited

U.S. PATENT DOCUMENTS

| | | | |
|---|---|---|---|
| 1,794,163 | 2/1931 | Follis | 74/474 |
| 1,818,241 | 8/1931 | Moulton | 74/475 |
| 2,100,936 | 11/1937 | Bonn | 74/474 |
| 2,277,675 | 3/1942 | Blackburn | 74/474 |
| 2,604,797 | 7/1952 | Peregrine | 74/483 R |
| 2,703,988 | 3/1955 | Stevens | 74/479 |
| 2,989,876 | 6/1961 | Rasmussen | 74/477 |
| 3,068,717 | 12/1962 | Meli et al. | 74/483 |
| 3,180,174 | 4/1965 | Walter | 74/477 |
| 3,583,184 | 6/1971 | Papale | 74/473 R |
| 4,096,765 | 6/1978 | Cochram | 74/479 |
| 4,118,999 | 10/1978 | Bieber | 74/475 |
| 4,337,674 | 7/1982 | Lawrence | 74/475 |
| 4,358,965 | 11/1982 | Schroeder | 74/475 |
| 4,365,522 | 12/1982 | Kubota et al. | 74/475 |

FOREIGN PATENT DOCUMENTS

500074 11/1954 Italy .................. 74/473 R

Primary Examiner—Leslie A. Braun
Assistant Examiner—Michael J. Gonet
Attorney, Agent, or Firm—Brooks & Kushman

[57] ABSTRACT

A shift control assembly for automatic transmissions having three shifting sticks which are sequence interlocked wherein each stick is shifted to perform a single gear change. Each of the shifting sticks is manually operated to rotate a common control shaft which is rotatably supported in a housing of the assembly. A mechanism is provided for transmitting the rotary motion of the control shaft to the automatic transmission to control the gear position of the automatic transmission. A button and plunger assembly and an interlock plate is provided for each of the shifting sticks to selectively allow the sticks to rotate the control shaft upon shifting of the sticks in a predetermined sequence and otherwise prevent rotation of the control shaft. A detent mechanism is provided to give each of the shifting sticks "feel". An optional staging stick may be provided with an over-center locking mechanism, the staging stick bypassing the interlock system provided for the three shifting sticks.

33 Claims, 15 Drawing Figures

SHIFT CONTROL ASSEMBLY

TECHNICAL FIELD

This invention relates to shift control assemblies and, in particular, to shift control assemblies having multiple shifting sticks for automatic transmissions.

BACKGROUND ART

In recent years there have been many improvements to automobile transmissions of both the automatic and manual type including improvements to facilitate shifting through the different speeds or gears of the transmission. In competitive or racing-type vehicles these improvements are especially welcome in that they reduce or essentially eliminate lost time as the transmission changes speeds or gears.

One concern of race car drivers is the concern over missing shifts between the various drive positions of an automatic transmission in addition to the park, neutral and reverse gear positions.

Another problem facing race car drivers is inadvertent overshifting or undershifting which causes the driver to lose time in his attempt to effect the desired shift.

Numerous prior art patents disclose a shift mechanism comprising a plurality of levers for shifting a transmission. For example, U.S. patent of Peregrine, U.S. Pat. No. 2,604,797, discloses a plurality of parallel levers constrained to pivot in parallel planes and thereby activate a plurality of mutually slidable interlocking plates furnished with apertures through which the levers pass and cam surfaces which co-act with the levers to cause translation of the plates. The U.S. patent to Meli et al, U.S. Pat. No. 3,068,71 discloses a transmission shifting control mechanism comprising a plurality of push buttons which cooperate with slidable ejector plates. U.S. patent to Bonn, Jr., U.S. Pat. No. 2,100,936 discloses a transmission control having four levers, each of which causes translation of an inner tubular shaft.

Other U.S. patents disclose a shifting mechanism having multiple levers. For example, U.S. patent to Blackburn, U.S. Pat. No. 2,277,675, discloses a shifting mechanism incorporation a plurality of superimposed guide plates which activate gear shifting yokes via camming surfaces in response to translation of individual guide plates. The U.S. patent to Follis, U.S. Pat. No. 1,794,163, discloses a three-lever gear-shifting mechanism wherein three levers operate in parallel to cause activation of slidable shift rods. U.S. patent to Moulton, U.S. Pat. No. 1,818,241, discloses a release trigger mechanism on a gear shift lever which controls a locking member.

DISCLOSURE OF THE INVENTION

An object of the present invention is to provide an improved shift control assembly for automatic transmissions wherein the assembly includes a plurality of shifting sticks and wherein one shifting stick is provided to accomplish each gear change to thereby avoid missing shifts.

Another object of this invention is to provide an improved shift control assembly for automatic transmissions having multiple shifting sticks wherein the shifting sequence of the shifting sticks is interlocked to prevent inadvertent overshifting or undershifting.

A further object of the invention is to provide a shift control assembly for automatic transmissions including multiple shifting sticks to provide relatively quick and accurate shifts of the transmission.

In carrying out the above objects and other objects of this invention, a preferred embodiment of the invention includes a housing, a control shaft rotatably supported in the housing and a mechanism for transmitting the rotary motion of the control shaft to the automatic transmission to control the gear position of the automatic transmission. At least two shifting sticks are provided wherein each of the shifting sticks is independently and operatively associated with the control shaft for shifting between at least two gear positions including at least one drive position. The assembly also includes two manually operable gear selector mechanisms wherein each of the selector mechanisms selectively and operatively connnect its respective stick to the control shaft to allow the sticks to rotate the control shaft upon shifting of the sticks in a predetermined sequence and otherwise preventing rotation of the control shaft.

Preferably, three shifting sticks are provided as well as three manually operable gear selector mechanisms.

Also, preferably, the control shaft has formed therein through its outer circumferential surface a plurality of holes which receive and retain therein a like plurality of plungers which rotate the control shaft in the extended positions of the plungers upon shifting of the sticks in a predetermined sequence determined by the arrangement of the holes about the shaft.

Also, preferably, each of the selector mechanisms includes a locking mechanism which locks its respective shifting stick in a selected gear position.

BEST MODE FOR CARRYING OUT THE INVENTION

Figures 1, 5, 6, 7:
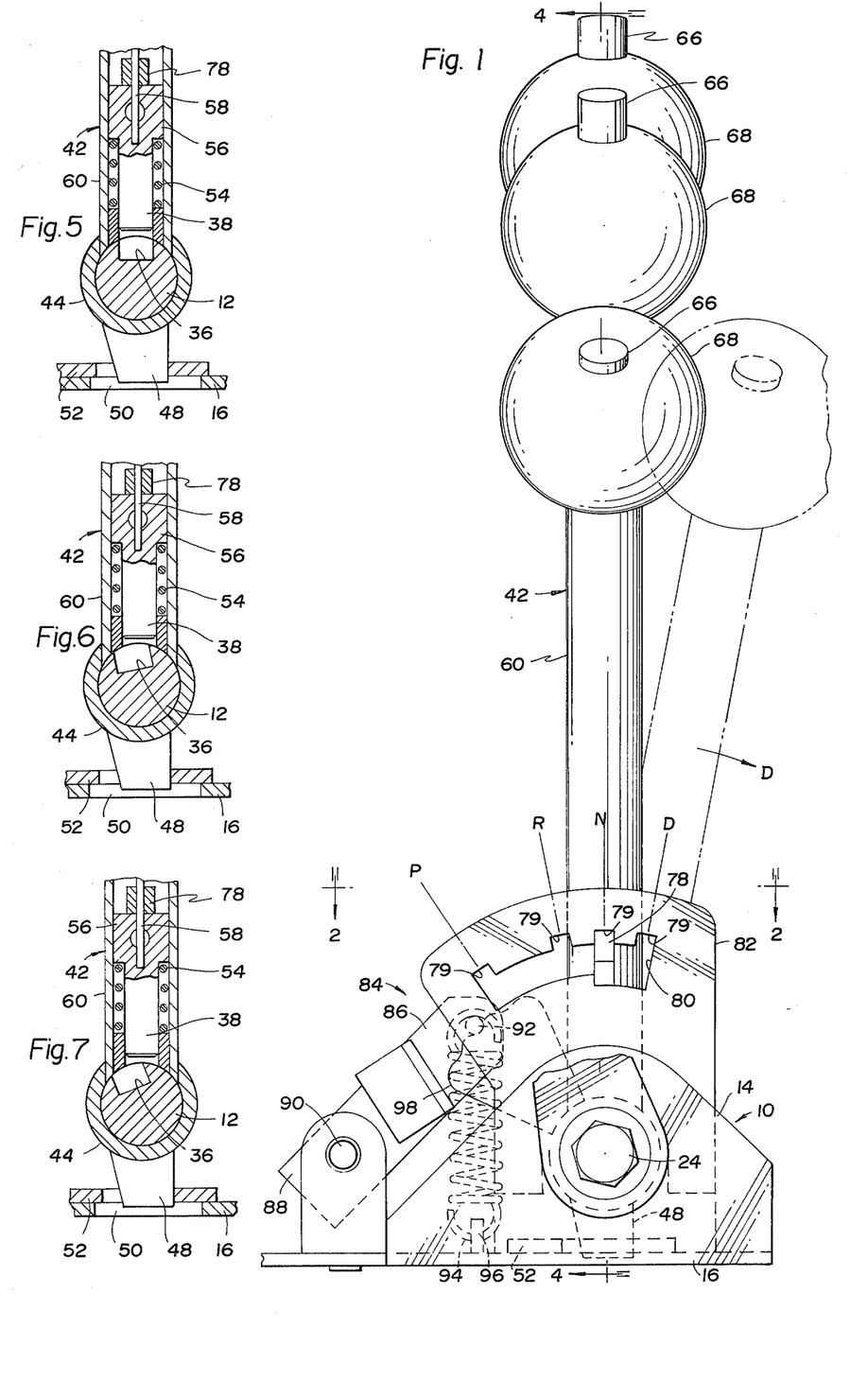
FIG. 1 is a side elevational view, partially broken away, to show the multi-stick, shift control assembly wherein one of the shifting sticks is shown in phantom in a second gear position.
FIG. 5 is a sectional view taken along lines 5—5 of FIG. 2.
FIG. 6 is a sectional view taken along lines 6—6 of FIG. 2.
FIG. 7 is a sectional view taken along lines 7—7 of FIG. 2.

Referring to FIG. 1, there is illustrated a first embodiment of a multi-stick shift control assembly for an automatic transmission constructed in accordance with the present invention.

Figure 4:
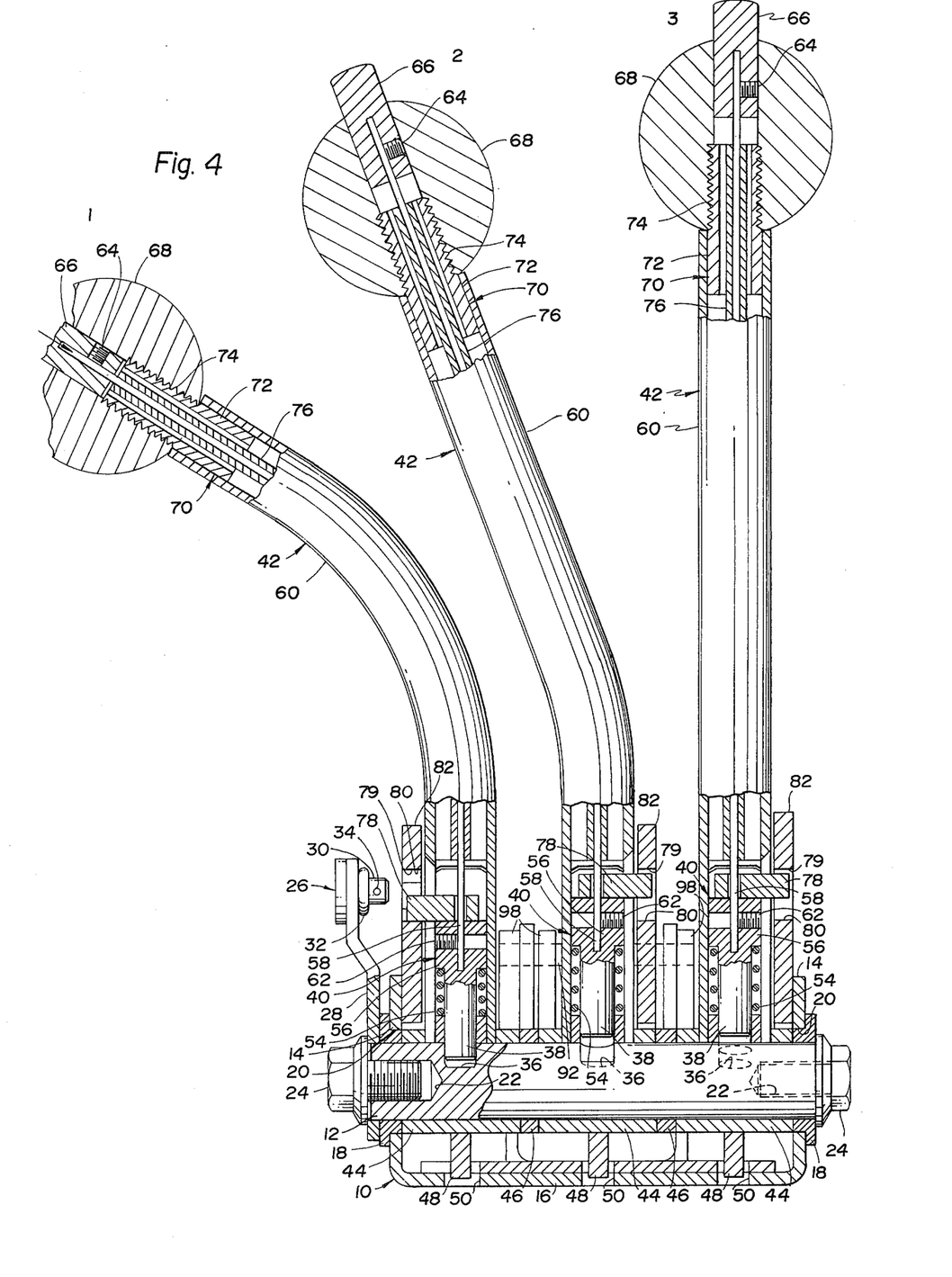
FIG. 4 is a view partially broken away and in cross-section taken along the lines 4—4 of FIG. 1.

The shift control assembly includes a housing generally indicated at 10. The housing 10 rotatably supports a cylindrical control shaft 12 as best shown in FIG. 4. The housing 10 includes a pair of upwardly extending support arms 14 integrally formed with an interconnecting base plate 16. The control shaft 12 is supported by bearings 18 disposed in holes 20 formed through the arms 14 to minimize the friction caused by rotation of the control shaft 12.

A pair of threaded holes are formed at the opposite facing ends of the control shaft 12 along the longitudinal axis of the control shaft 12. The holes 22 threadedly receive locking bolts 24 which retain the control shaft 12 by its corresponding bolt 24 to rotate with the control shaft 12. The mechanism 26 includes a cable arm 28 and a horizontally extending pin 30 connected at the free end of the cable arm 28 which provides an attachment location for a transmission cable 32 of an automatic transmission (not shown). A cotter pin (not shown) extends through a hole 34 formed through the free end of the pin 30 to maintain the cable 32 on the pin 30.

Three radially extending holes 36 are also formed in the control shaft 12 at longitudinally spaced positions along the control shaft 12. As best shown in FIGS. 5 through 7 the holes 36 are formed in the outer circumferential surface of the control shaft 12 at different offset positions. Each hole 36 is adapted to receive and retain therein the plunger part 38 of a button and plunger assembly generally indicated at 40. Each button and plunger assembly 40 is operatively disposed within a hollow portion of its respective shifter stick assembly, generally indicated at 42.

Each shifter stick assembly 42 includes a collar portion 44 which is rotatably mounted about the control shaft 12. The collar portions 44 are separated from each other by spacers 46 which allow the collar portions 44 and, consequently, each shifter stick assembly to rotate independently from each other about the control shaft 12.

Each of the collar portions 44 has secured thereto, such as by welding at its lower surface, a stop member 48. The stop members 48 extend into apertures 50 formed through the base plate 16 and through a common stop plate 52 which is mounted upon the top surface of the base plate 16, such as by welding. As best shown in FIGS. 5 through 7, the stop plate 52 limits the amount of travel of the stop members 48 and, consequently, of the shifter stick assemblies 42.

Each button and plunger assembly 40 includes a spring 54 which extends between its respective collar portion 44 and an angular flange portion 56 of a plunger part 38 to normally bias the plunger part 38 away from the collar portion 44 and, consequently, away from the control shaft 12. The assembly 40 also includes a cable 58 which extends along the length of a stem 60 of the assembly 42. The cable 58 is connected at the annular portion 56 of the plunger part 38 by a set screw 62 at one end thereof and is connected at its opposite end by a set screw 64 to a button 66. Each button 66 is slidably mounted in a manually operated knob 68 which, in turn, is threadedly secured to the free end of the stem 60 by a fitment 70. The fitment 70 includes a cylindrical portion 72 which is fitted into the free end of the stem 60 and an exteriorly threaded portion 74 on which the knob 68 is threadedly mounted. An elongated, hollow, metal sheath 76 is disposed in the fitment 70 and the stem 60 and carries the cable 58 therewithin.

Each button and plunger assembly 40 also includes a metal tang 78 which is fixedly secured to the cable 58 adjacent the annular portion 56 of the plunger part 38 and extends through a hole found in the stem 60. Movement of the bottom 66 of the leftmost shifter stick assembly 72 into the position shown in FIG. 4, not only causes the plunger part 38 to move against the biasing of its spring 54 (to thereby move into its hole 36 in the control shaft 12 when aligned), but also causes the tang 78 to move downwardly in a vertically extending portion 79 of a slot 80 formed through an interlock plate 82 as best shown in FIG. 1. The path followed by the leftmost shifter stick assembly 42 of FIG. 4 is shown in FIG. 1 wherein each vertically extending portion 79 of the path 80 defines a gear position of the automatic transmission. In the example shown in FIG. 1, the rightmost vertically extending portion 79 defines a drive position, the adjacent vertically extending portion 70 defines a neutral position, the next adjacent vertically extending portion 79 defines the reverse gear position and the leftmost vertically extending portion 79 defines the park position of the automatic transmission.

Figure 3:
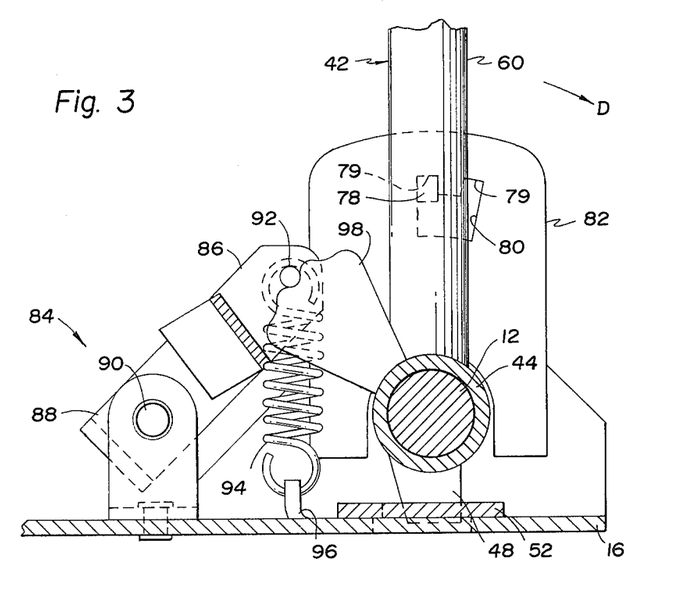
FIG. 3 is a sectional view taken along lines 3—3 of FIG. 2.

The configuration of the slot 80 of the middle shifter stick assembly 42 and the rightmost shifter stick assembly 42 in FIG. 4 is shown in FIG. 3 wherein the rightmost vertically extending portion 79 defines one gear position of the automatic transmission and the leftmost vertically extending portion 79 defines the second position of the automatic transmission.

Figure 2:
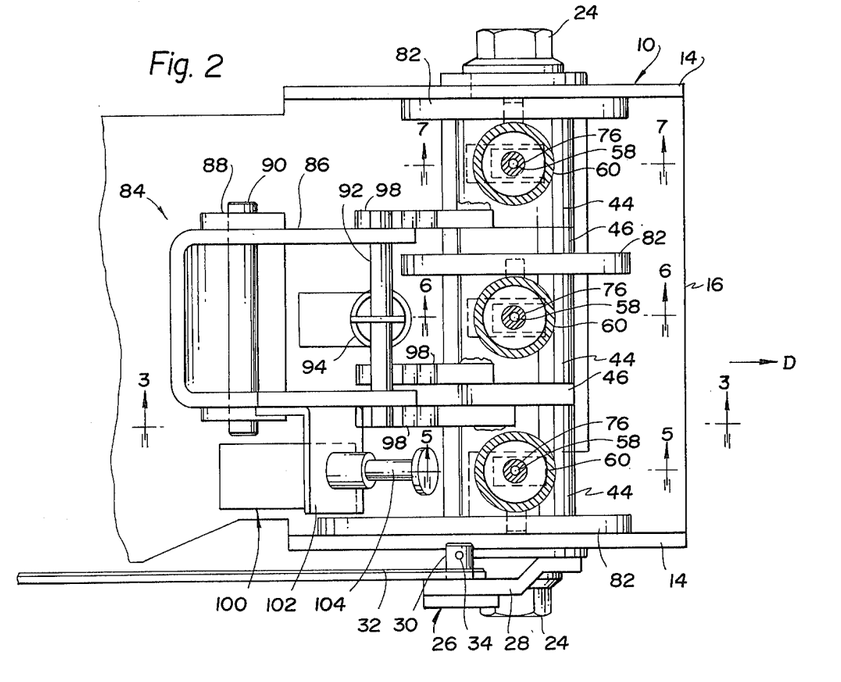
FIG. 2 is a sectional view taken along lines 2—2 of FIG. 1.

As best shown in FIGS. 1 through 3, the shift control assembly also includes a detent mechanism generally indicated at 84 for securing the shifter stick assemblies 42 in their respective selective gear positions. The detent mechanism 84 includes a U-shaped bracket 86 mounted for rotation on the housing 10 by a second U-shaped bracket 88 which carries a pivot pin 90 which extends through both sets of arms of the U-shaped brackets 86 and 88.

A second pin 92 extends between the upwardly extending arms of the U-shaped bracket 86 adjacent their free ends thereof. An extension spring 94 is connected at one end thereof to the second pin 92 and its opposite end is connected to an outwardly turned flange 92 of the base plate 16 in order to downwardly bias the second pin 92. The pin 92 engages detents formed in the outer peripheral surfaces of detent plates 98. The detent plates 98 are fixedly secured to their respective collar portions 44 to rotate therewith and simultaneously engage the second pin 92 to add "feel" to the shift control assembly.

Referring again to FIG. 2, a safety switch 100 is mounted on a mounting flange 102 of the U-shaped bracket 82. The safety switch 100 specifically comprises a neutral safety switch which provides a signal when a plunger portion 104 of the switch 100 is engaged by the leftmost shifter stick assembly 42 as shown in FIG. 4. Such engagement occurs when the leftmost shifter stick assembly 42 moves out of its neutral position towards its reverse position as shown in FIG. 1.

Figure 8:
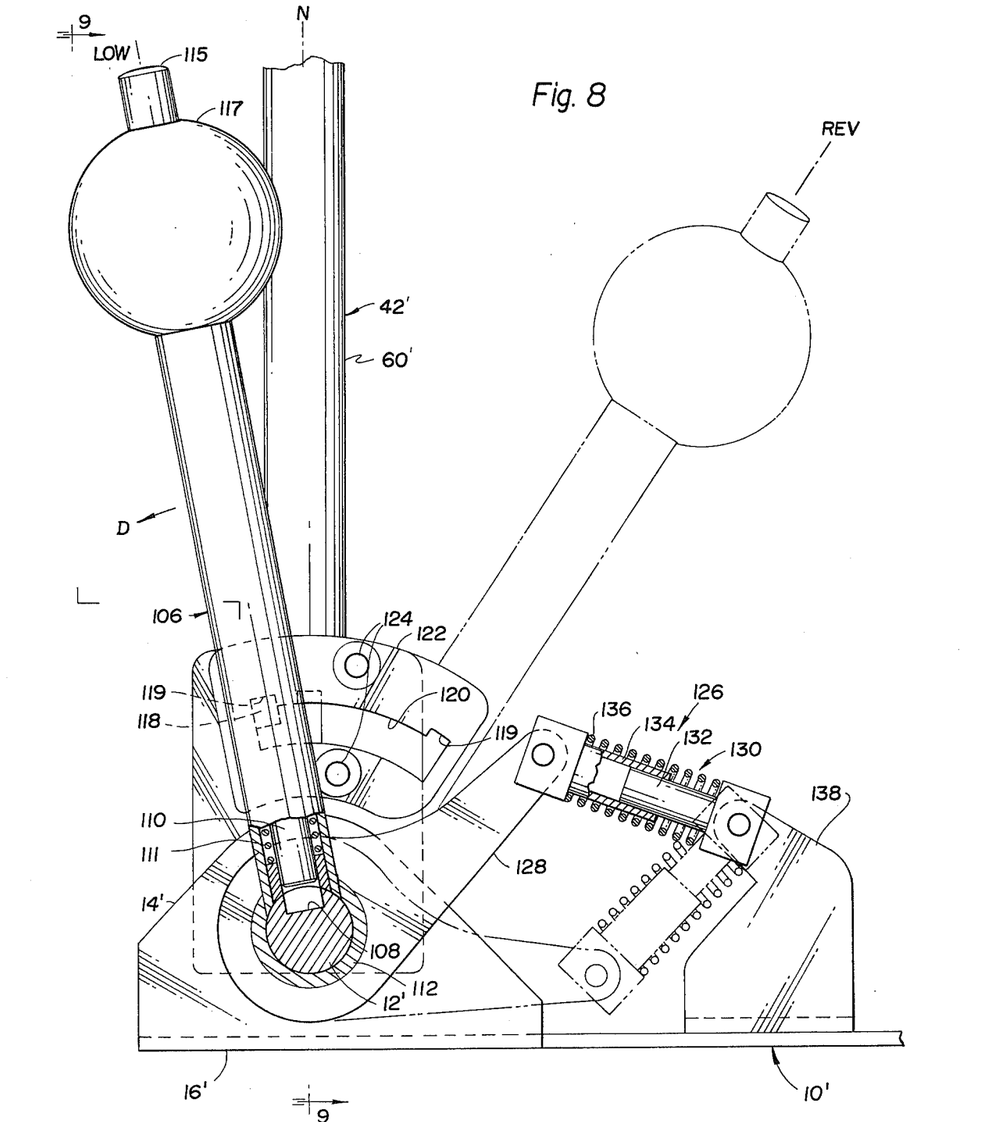
FIG. 8 is a view taken long the lines 8—8 of FIG. 9, partially broken away and in cross-section illustrating a second embodiment of the present invention and including a staging stick assembly shown in one of its operative positions in phantom.
Figure 9:
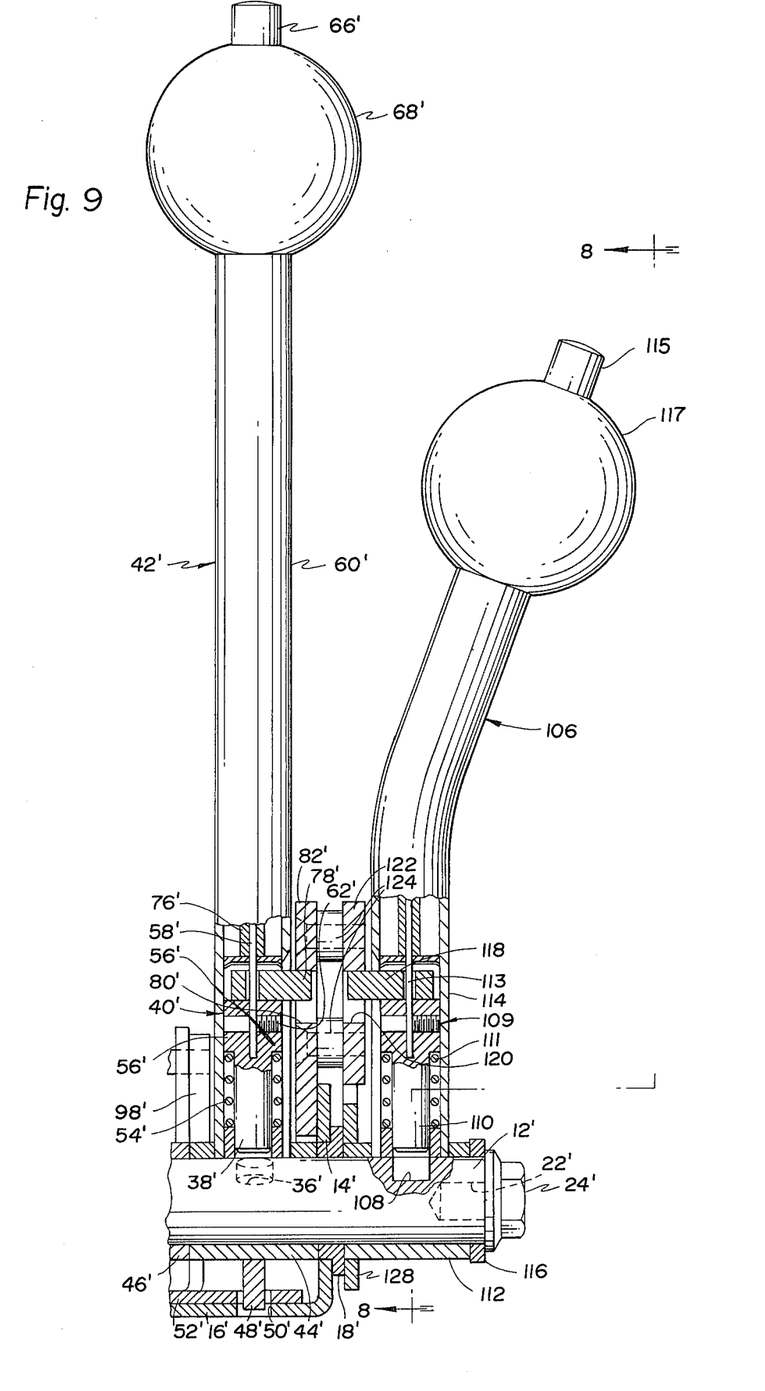
FIG. 9 is a view taken along the lines 9—9 of FIG. 8 broken away and in cross-section.

Referring now to FIGS. 8 and 9, there is illustrated a second embodiment of the invention wherein the shift control assembly includes a staging stick assembly 106. The staging stick assembly 106 is used to bypass the interlocks of the other three shifting stick assemblies 42', only one of which is shown in FIG. 9, to allow the driver to shift between low and reverse as shown in FIG. 8 as he prepares or stages his car at a starting line.

Since many of the components of the embodiment shown in FIGS. 8 and 9 perform the same or similar functions as in the first embodiment, a prime designation will be applied to numerals corresponding to the same or similar parts of the first embodiment. For example, the second embodiment includes a control shaft 12' which is similar to the control shaft 12 of the first embodiment. However, the control shaft 12' is longer to accommodate the staging stick assembly 106.

The control shaft 12' includes a hole 108 in which a plunger part 110 may be received and retained in the same fashion that a plunger part 38' of the assembly 40' is received and retained within a hole 36' formed in the central shaft 12'. The staging stick assembly 106 also includes a collar portion 112 and a stem 114 integrally formed together to move together in a rotary fashion about the control shaft 12'. A bearing 116 is secured to the control shaft 12' by a locking bolt 24' to secure the assembly 106 on the control shaft 12'.

The staging stick assembly 106 also includes a button and plunger assembly 109 which is substantially the same in structure and function as the button and plunger assemblies 40. For example, the button and plunger assembly 109 includes a plunger part 110 biased by a spring 111 outwardly away from the control shaft 12'. Similarly, the button and plunger assembly 109 includes rod 113 which interconnects the plunger part 110 with a button 115 disposed above the top surface of a knob 117. Furhermore, the button and plunger assembly 109 includes a tang 118 which moves with the rod 113 and the plunger part 110 in a slot 120 formed in an interlock plate 122. In turn, the interlock plate 122 is fixedly secured by pins 124 to an interlock plate 82' of the shifter stick assembly 42'.

The path followed by the tang 118 during movement of the stem 114 after depression of the button 115 is best shown in FIG. 8 wherein vertically extending portions 117 of the slot 120 define the low gear position and the reverse gear position of the automatic transmission.

The staging stick assembly 106 also includes a spring-biased, over-center mechanism generally indicated at 126. The over-center mechanism 126 is provided to minimize the chance of placing the control shaft 12' in any gear position other than low or reverse. The over-center mechanism 126 includes a lever 128 fixedly connected to the collar portion 112 to rotate therewith. The lever 128 is pivotally connected at its free end thereof to one end of a spring-biased piston-cylinder arrangement 130 wherein a piston 132 is normally urged out of its cylinder 134 by the spring 136. The opposite end of the arrangement 130 is pivotally secured to an upwardly extending flange portion 138 of the base plate 16'. Upon movement of the lever 128 through and over its center position with respect to the cylinder-piston arrangement 130, the over-center mechanism is locked or secured in its reverse position as indicated in phantom in FIG. 8.

Figure 10:
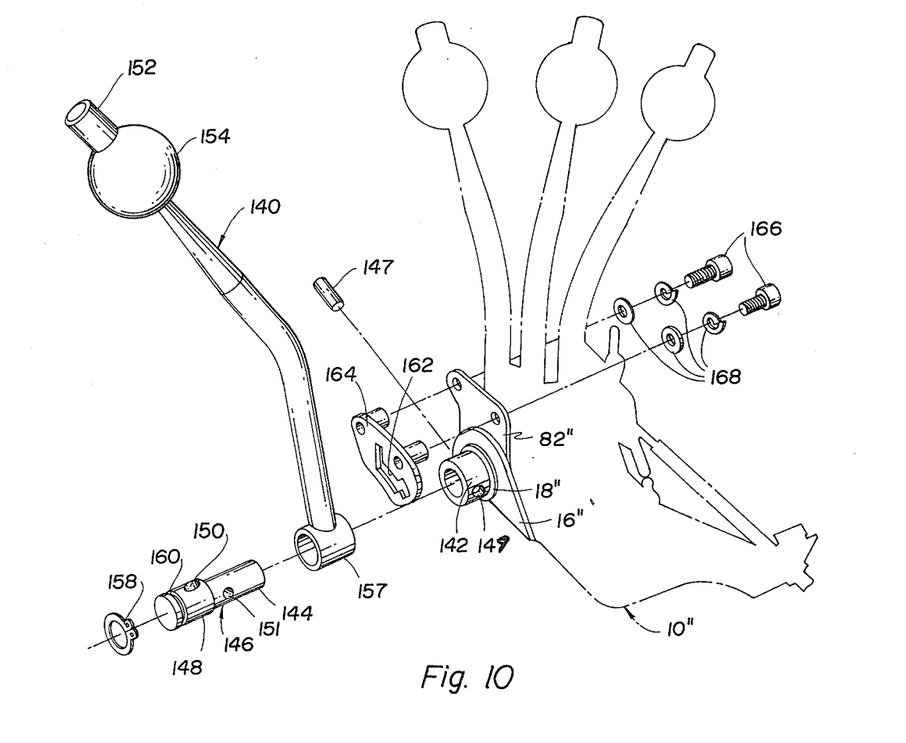
FIG. 10 is an exploded perspective view illustrating a third embodiment of the present invention including a different staging stick assembly.
Figure 13:
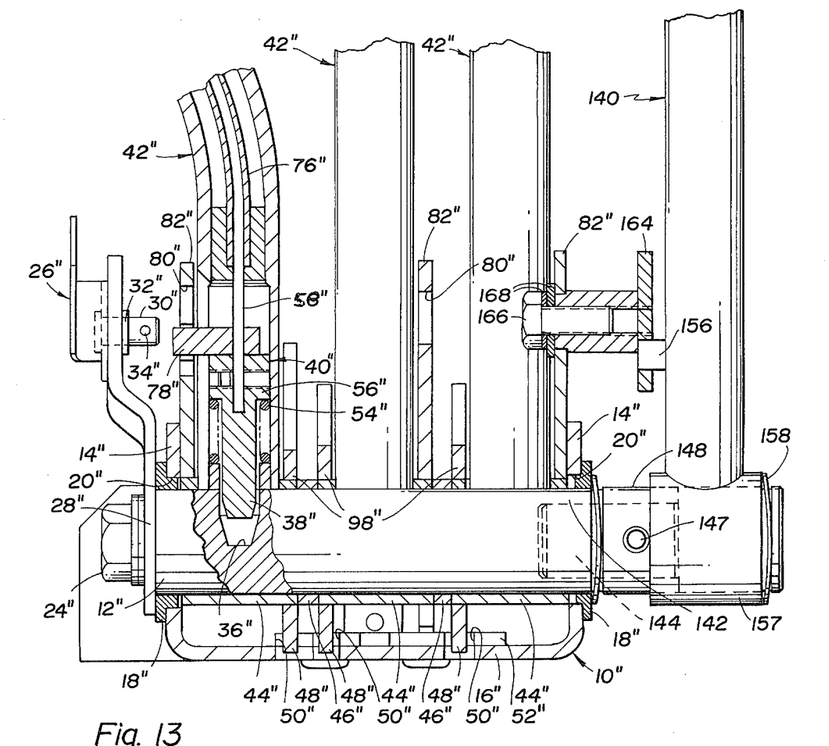
FIG. 13 is a view, partially broken away and in cross-section, of the shift control assembly of FIG. 10.

With reference to FIGS. 10 and 13, there is illustrated a third embodiment of the present invention wherein a shift control assembly includes, as an option, a different staging stick assembly 140. As was done in the description of the second embodiment, like components to the components shown in the first embodiment are given the same reference numeral but have a double prime designation.

As best shown in FIG. 13, a control shaft 12" includes a female type connector end 142 by a locking pin 147 which extends through aligned holes 149 and 151 formed through the female connector end 142 and the male connector end 144, respectively.

The adaptor extension 146 includes a cylindrical body portion 148 having a hole 150 extending therein from its outer peripheral surface to receive and retain therein a plunger part (not shown) of the staging stick assembly 140. As in the case of the staging stick assembly 106, the staging stick assembly 140 includes an actuating button 152 which is mounted for movement in a knob 154 to not only actuate the plunger part but also move an interlocking tank 156. The staging stick assembly 140 also includes a collar portion 156 which is mounted on the body portion 148 to rotate upon actuation of the button 152 and rotation of the assembly 140. A retaining ring 158 locks the collar portion 156 on the control shaft 12". The ring 158 is disposed in a circumferential groove 160 formed adjacent the free end of the body portion 148 of the adaptor extension 146.

Figure 11:
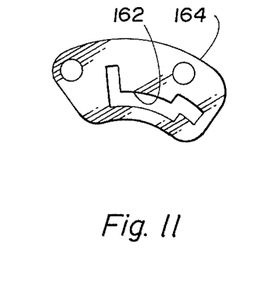
FIG. 11 is a side elevational view of an interlock plate for use with the staging stick of FIG. 10.

The tang 156 is similar in operation of the tang 118 of the staging stick assembly 106 in that it is disposed in a slot 162 in a detent plate 164 which defines a path of movement for the tank 156. The detent plate 164 is fixedly secured to the remainder of the shift control assembly by a locking bolt 166 and washers 168 at an interlock plate 82" of a shifter stick assembly 42'.

Figure 12:
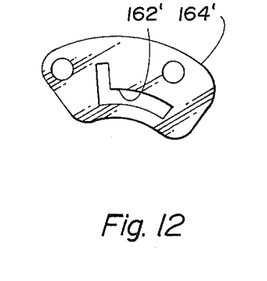
FIG. 12 is a side elevational view of an alternative interlock plate for the staging stick of FIG. 10.

A detent plate 164' having a different groove 162' is shown in FIG. 12 wherein the path defined by the groove 162' is applicable for a reversed valve body transmission.

Figure 15:
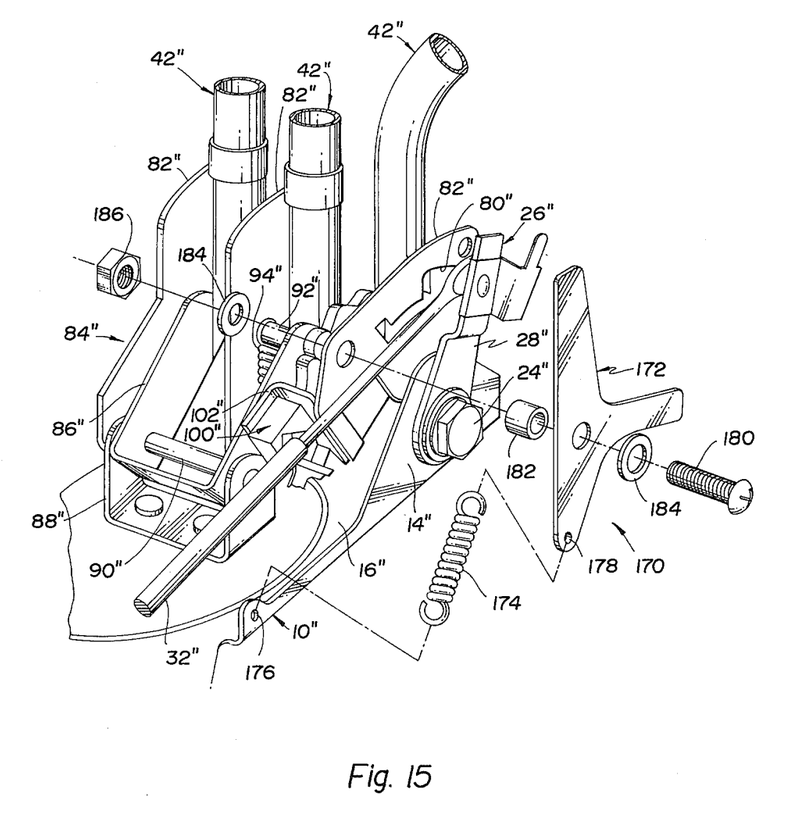
FIG. 15 is an exploded perspective view illustrating the various components of the shift control assembly of FIG. 13.

Referring now to FIG. 15, there is disclosed a lockout mechanism generally indicated at 170. The lockout mechanism 170 includes a lever 172 which is rotatably mounted on an interlock plate 82" of the shift control assembly. The lever 172 is biased by an extension spring 174 which extends between and is connected at its ends to an upwardly extending flange 176 of the arm 14" and an arm 178 of the lever 172. The lever 172 is mounted on the interlock plate 82" by means of an assembly comprising a screw 180, pivot sleeve 182, a washer 184, and a locking nut 186. The lockout mechanism 170 prevents the driver of the car from shifting the shift control assembly into reverse inadvertently during, for example, racing.

Figure 14:
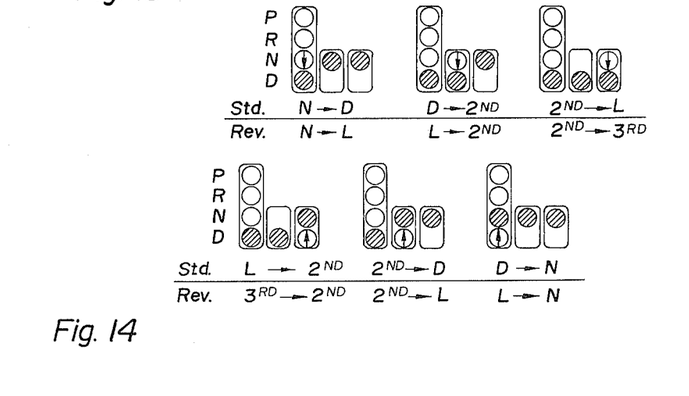
FIG. 14 is a diagram illustrating the various shift patterns and the resulting gear positions of the shift control assembly of the present invention.

Referring now to FIG. 14, there is illustrated shifting patterns for the three shifter stick assemblies 42 for both standard and reversed valve body transmissions. Crosshatched circles represent actual positions of the shifter stick assemblies 42. Arrows represent movement of a particular shift stick assembly 42 from one gear position to another. The letters P, R, N and D represent the words Park, Reverse, Neutral and Drive, respectively. L, 2nd and 3rd represent low, second, and third drive gear positions, respectively.

For example, to shift the transmission from neutral to drive for a standard transmission or from neutral to low for a reversed valve transmission, the leftmost shifter stick assembly 42 is moved from its neutral position as shown by the solid lines in FIG. 1 to the drive position as indicated by phantom lines in FIG. 1, each of the other two shifter stick assemblies 42 being maintained in their neutral positions as shown in FIG. 1. Prior to this shift, however, in a non-shift mode, all of the plungers parts 38 are spring-loaded up and the tangs 78 are keyed into their respective interlock plates 82. Consequently, none of the shifting stick assemblies 42 can be moved. When the button 66 on the leftmost shifting stick assembly 42 is depressed, its plunger 38 enters its respective hole 36 in the control shaft 12 and its tang 78 comes out of its interlock plate 82 allowing the shifting assembly 42 to move, thereby effecting the desired shift.

When the leftmost shifting stick assembly is in the position as indicated in phantom in FIG. 1, a middle hole 36 in the control shaft 12 is in a position to accept the plunger part 38 of the middle shifting stick assembly 42. Depressing the button 66 of this shifting stick assembly 42 moves its plunger 38 into its respective hole 36 and its tang 78 out of its respective interlock plate 82 thereby allowing the middle shifting stick assembly 42 to move to its second gear position as indicated by the illustration in the first row and second column of FIG. 14. Likewise, shifting is accomplished for the rightmost shifting stick assembly 42.

Upshifting is accomplished in reverse order as indicated by the second row of illustrations of FIG. 14.

With reference to the operation of the staging stick assemblies 106 and 140, all of the shifting stick assemblies must initially be in their rearmost position as shown in the first row, third column of FIG. 14. To operate the staging stick assemblies 106 and 140, their respective buttons 115 and 152 must first be depressed and the assemblies must be pushed forward or rearward to the ends of their travel to obtain the desired gear positions.

While preferred embodiments of a shift control assembly have been shown and described herein in detail, those skilled in this art will recognize various alterative designs and embodiments for practicing the present invention as defined by the following claims.

What is claimed is:

1. A shift control assembly for an automatic transmission, said assembly comprising:
   a housing;
   a control shaft rotatably supported in said housing;
   a mechanism for transmitting the rotary motion of the control shaft to the automatic transmission to control the gear position of the automatic transmission;
   at least two shifting sticks, each of said shifting sticks being independently operatively associated with said control shaft for shifting between at least two gear positions, including at least one drive position; and
   at least two manually operable gear selector mechanisms, each of said selector mechanisms selectively and operatively connecting its respective stick to the control shaft to allow the sticks to rotate the control shaft upon shifting of the sticks in a predetermined sequence and otherwise being uneffective to cause rotation of the control shaft.

2. The assembly as claimed in claim 1 wherein each of said selector mechanisms includes a locking mechanism operatively associated with said housing to lock its corresponding shifting stick in its respective gear position.

3. The assembly as claimed in claim 2 wherein each of said locking mechanisms includes a locking plate and a slot formed in said plate.

4. The assembly as claimed in claim 3 wherein each of said locking mechanisms includes an upwardly biased follower pin extending laterally outwardly from its respective shifting stick and into said slot, said slot defining a path for said pin.

5. The assembly as claimed in claim 4 wherein each of said slots includes a pair of generally upwardly extending vertical portions interconnected by a generally horizontal, arcuate portion, said vertical portions defining the gear positions of its respective stick.

6. The assembly as claimed in claim 1 including a third shifting stick and a third manually operable gear selector mechanism selectively and operatively connecting the third shifting stick to the control shaft, said selectively mechanisms allowing the sticks to rotate the control shaft upon shifting of the sticks in a second predetermined sequence and otherwise preventing rotation of the control shafts.

7. The assembly as claimed in claim 1 or claim 6 wherein one end of said control shaft is adapted for connection to a staging stick.

8. The assembly as claimed in claim 1 or claim 6 including a staging stick independently operatively associated with said control shaft for shifting between at least two gear positions including at least one drive position.

9. The assembly as claimed in claim 8 including a staging selector mechanism selectively and operatively connecting the staging stick to the control shaft to allow the staging stick to rotate the control shaft, the other sticks being arranged in predetermined arrangement relative to said control shaft and otherwise preventing rotation of the control shaft by said staging stick.

10. The assembly as claimed in claim 9 including a spring-biased, over-center mechanism connected to said staging stick and said housing for locking said staging stick in at least one of said gear positions.

11. The assembly as claimed in claim 1 or claim 6 including a detent mechanism mounted on said housing to secure said sticks in their respective, selected gear positions.

12. The assembly as claimed in claim 11 wherein said detent mechanism includes at least two detent plates, each of said detent plates being mounted for movement with its respective shift stick at one end thereof and having at least two detents formed therein at the opposite end thereof corresponding to the gear positions of its respective shift stick.

13. The assembly as claimed in claim 12 wherein said detent mechanism includes a common spring-biased locking pin for simultaneously holding all of said detent plates at selected ones of said detents.

14. The assembly as claimed in claim 1 or claim 6, including a safety switch adjacent one of said shift sticks, said switch supplying a signal upon movement of said one of said sticks into a selected one of said gear positions.

15. The assembly as claimed in claim 1 or claim 6 including a lock-out mechanism mounted on said housing to inhibit movement of one of said sticks into a selected one of said gear positions.

16. A shift control assembly for an automatic transmission, said assembly comprising:
   a housing;

a cylindrical control shaft rotatably supported in said housing, said control shaft having at least two holes extending into the shaft from the outer circumferential surface of the shaft, said holes being spaced apart along a longitudinal axis of the shaft;

a mechanism mounted at one end thereof to said control shaft to rotate therewith for transmitting the rotary motion of the control shaft to the automatic transmission to control the gear position of the automatic transmission;

at least two shifting sticks, each of said shifting sticks being independently rotatably mounted on said control shaft for shifting between at least two gear positions including at least one drive position; and at least two manually operable plunger assemblies, each of said plunger assemblies selectively and operatively connecting its respective stick to the control shaft wherein each of said plunger assemblies includes a plunger portion selectively movable between extended and retracted positions and wherein each of said holes is adapted to receive and retain its respective plunger portion in its extended position to rotate the control shaft upon shifting of its respective shifting stick in a predetermined sequence determined by the arrangement of said holes about said control shaft.

17. The assembly as claimed in claim 16 including at least two locking mechanisms, each of said locking mechanisms being operatively associated with said housing and operatively connected to its respective plunger assembly to lock its respective shifting stick in a selected gear position.

18. The assembly as claimed in claim 16 including a third shifting stick and a third manually operable plunger assembly selectively and operatively connecting the third stick to the control shaft.

19. The assembly as claimed in claim 18 including a third locking mechanism, said third locking mechanism being operatively associated with said housing and operatively connected to the third plunger assembly to lock the third stick in its selected gear positions.

20. The assembly as claimed in claim 18 wherein said control shaft has a third hole extending into the shaft from its outer circumferential surface, said third hole being spaced apart from each of said other two holes and wherein said third plunger assembly includes a plunger portion movable between extended and retracted positions, said third plunger portion being received and retained in said third hole in said extended position to rotate the control shaft upon shifting of the third stick, said sticks rotating said control shafts upon shifting of said sticks in a second predetermined sequence determined by the arrangement of said holes bout said shaft.

21. A shift control assembly for an automatic transmission, said assembly comprising:

a housing;

a cylindrical control shaft rotatably supported in said housing, said control shaft having three holes extending into the shaft from the outer circumferential surface of the shaft, said holes being spaced apart along a longitudinal axis of the shaft;

a mechanism mounted at one end thereof to said control shaft to rotate therewith for transmitting the rotary motion of the control shaft to the automatic transmission to control the gear position of the automatic transmission;

three shifting sticks, each of said shifting sticks being independently rotatably mounted on said control shaft for shifting between at least two gear positions including at least one drive position;

three manually operable plunger assemblies, each of said plunger assemblies selectively and operatively connecting its respective stick to the control shaft wherein each of said plunger assemblies includes a plunger portion selectively movable between extended and retracted positions and wherein each of said holes is adapted to receive and retain its respective plunger portion in its extended position to rotate the control shaft upon shifting of its respective shifting stick in a predetermined sequence determined by the arrangement of said holes about said control shaft; and three locking mechanisms, each of said locking mechanisms being operatively associated with said housing and operatively connected to its respective plunger assembly to lock its respective shifting stick in a selected gear position.

22. The assembly as claimed in claim 19 or claim 21 wherein each of said locking mechanisms includes a locking plate and a slot formed in said plate.

23. The assembly as claimed in claim 22 wherein each of said locking mechanisms includes an upwardly biased follower pin extending laterally from its respective shifting stick and into said slot, said slot defining a path for said pin.

24. The assembly as claimed in claim 23 wherein each of said slots includes a pair of generally upwardly extending vertical portions interconnected by a generally horizontal, arcuate portion, said vertical portions defining the gear positions of its respective stick.

25. The assembly as claimed in claim 16 or claim 21 wherein one end of said control shaft is adapted for connection to a staging stick.

26. The assembly as claimed in claim 16 or claim 21 including a staging stick independently operatively associated with said control shaft for shifting between at least two gear positions including at least one drive position.

27. The assembly as claimed in claim 26 including a staging selector mechanism selectively and operatively connecting the staging stick to the control shaft to allow the staging stick to rotate the control shaft, the other sticks being arranged in predetermined arrangement relative to said control shaft and otherwise preventing rotation of the control shaft by said staging stick.

28. The assembly as claimed in claim 27 including a spring-biased, over-center mechanism connected to said staging stick and said housing for locking said staging stick in at least one of said gear positions.

29. The assembly as claimed in claim 16 or claim 21 including a detent mechanism mounted on said housing to secure said sticks in their respective, selected gear positions.

30. The assembly as claimed in claim 27 wherein said detent mechanism includes at least two detent plates, each of said detent plates being mounted for movement with its respective shift stick at one end thereof and having at least two detents formed therein at the opposite end thereof corresponding to the gear position of its respective shifting stick.

31. The assembly as claimed in claim 30 wherein said detent mechanism includes a common spring-biased locking pin for simultaneously holding all of said detent plates at selected ones of said detents.

32. The assembly as claimed in claim 16 or claim 21, including a safety switch adjacent one of said shift sticks, said switch supplying a signal upon movement of said one of said sticks into a selected one of said gear positions.

33. The assembly as claimed in claim 19 or claim 21 including a lock-out mechanism mounted on said housing to inhibit movement of one of said sticks into one of said gear positions.

* * * * *

UNITED STATES PATENT AND TRADEMARK OFFICE
CERTIFICATE OF CORRECTION

PATENT NO. : 4,485,689

DATED : December 4, 1984

INVENTOR(S) : Emanuel F. Cambria

It is certified that error appears in the above-identified patent and that said Letters Patent is hereby corrected as shown below:

Column 1, line 35, "3,068,71" should be -- 3,068,717 --.

Column 1, line 44, "incorporation" should be -- incorporating --.

Column 5, line 57, "over" should be -- other --.

Column 6, line 24, "tank" should be -- tang --.

Column 6, line 35, "tank" should be -- tang --.

Column 6, line 38, "42'" should be -- 42" --.

Column 9, line 55, "bout" should be -- about --.

Signed and Sealed this

Twenty-fifth Day of June 1985

[SEAL]

Attest:

DONALD J. QUIGG

Attesting Officer

Acting Commissioner of Patents and Trademarks